United States Patent [19]
Kegan

[11] Patent Number: 5,819,248
[45] Date of Patent: Oct. 6, 1998

[54] PERSUASION ORGANIZER AND CALCULATOR

[76] Inventor: Daniel L. Kegan, 2027 Ridge Ave., Evanston, Ill. 60201-2713

[21] Appl. No.: 400,543

[22] Filed: Mar. 8, 1995

Related U.S. Application Data

[63] Continuation of Ser. No. 263,246, Jun. 21, 1994, abandoned, which is a continuation of Ser. No. 119,897, Sep. 10, 1993, abandoned, which is a continuation of Ser. No. 635,757, Dec. 31, 1990, abandoned.

[51] Int. Cl.$^6$ ................................................ G06F 15/18
[52] U.S. Cl. ........................ 706/45; 706/59; 706/933
[58] Field of Search .............................. 395/50, 51, 933; 706/45, 59, 933

[56] References Cited

U.S. PATENT DOCUMENTS

| | | | |
|---|---|---|---|
| 4,590,557 | 5/1986 | Lillie | 395/651 |
| 4,803,641 | 2/1989 | Hardy et al. | 706/60 |
| 4,858,170 | 8/1989 | DeWick, Sr. et al. | 707/534 |
| 4,930,077 | 5/1990 | Fan | 704/8 |
| 4,967,368 | 10/1990 | Bolling et al. | 706/52 |
| 4,991,477 | 2/1991 | Farwell | 600/544 |
| 5,014,327 | 5/1991 | Potter et al. | 382/220 |
| 5,043,891 | 8/1991 | Goldstein et al. | 707/531 |
| 5,159,180 | 10/1992 | Feiler | 235/375 |
| 5,170,464 | 12/1992 | Hayes et al. | 706/60 |
| 5,195,172 | 3/1993 | Elad et al. | 706/11 |
| 5,333,237 | 7/1994 | Stefanopoulos et al. | 706/11 |
| 5,377,354 | 12/1994 | Scannell et al. | 706/47 |

OTHER PUBLICATIONS

R.G. Vedder and R.O. Mason, "An Expert System Application for Decision Support in Law Enforcement," Decision Sciences, vol. 18(3), pp. 400–414, Jul. 1987.

L. Johnson and E.T. Keravnou, "Expert Systems Architectures," GP Publishing, Inc., pp. 6–29, Dec. 1988.

*Primary Examiner*—Robert W. Downs
*Attorney, Agent, or Firm*—Kegan & Kegan, Ltd.; Marc E. Fineman

[57] ABSTRACT

A persuasion organizer and calculator with which attorneys and others required to form and develop persuasive arguments may create, modify, and control a knowledge base and a persuasive calculus without the need for a knowledge engineer. By eliminating the knowledge engineer from the process of creating and maintaining a knowledge base, the present invention minimizes the problems of ambiguity and confusion found in the prior art. The present invention provides a structure for litigators that allows simple, non-expert creation and modification of decisional frameworks, objective and subjective probabilities, and standards of proof. Furthermore, the present invention allows the user to analyze the elements of a persuasive argument (including matters, issues, facts, laws, evidence, witnesses, and the like) to predict the strength of such an argument and determine elements which may require additional support and resource allocation. Since the persuasion organizer and calculator is computer controlled and computer operated, it provides clear displays of hierarchically related information, accurate calculation of probabilities, and the ability for users to make simple, non-expert modifications. When coupled with a traditional legal case management system, administrative and psychological incentives are provided for users to enter and maintain detailed evidence and subjective probability estimates necessary for rational litigation management and evaluation of litigation strategies, current and past.

17 Claims, 17 Drawing Sheets

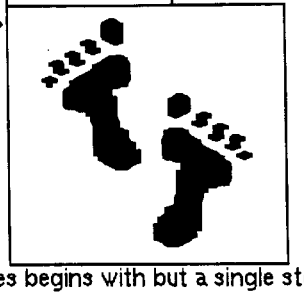
Fig. 4
Fig. 5a (upper) and 5b (lower)

```
╔═══════════════════════ Fact ═══════════════════════╗
│ Cudgel Manual & Tutorial              Dec 3, 1989  │
│ GreenLight Software/ Elan Associates               │
│                                                    │
│   Fact Line │ △ First IL use of Mark is no earlier than 24Aug87 │
│   Date Fact │ Aug 24, 1987 │
│   Status F  │ Contested    │
│     Hot F±% │              │
│  •Main Law                Under common law, first user of a mark in an
│     RecL #  │        6 │   area gains tm rights
│     -F Pair │          │
│  Box 1 2 3  │  │  │  │
│                                      Elan (GreenLight)
│  4         Nov 11, 1989  00:00   │dlk│            1│
│ RecF        Last Revised          By   CaseRec
╚════════════════════════════════════════════════════╝
```

Fig. 6

```
╔═══════════════════════ Law ════════════════════════╗
│ Cudgel Manual & Tutorial              Dec 5, 1989  │
│ GreenLight Software/ Elan Associates               │
│     Enter                                          │
│  Cite Rec# │       12 │ Architemps Inc v Architemps Ltd, 9
│   At Page; │     1007 │ USPQ2d (BBNA) 1826, 1827 (SD NY
│                        1988).
│ Then Enter
│   Issue Rec.│       1 │ π has rights senior to △ for Mark in π
│     Hot L±% │      60 │ Territory
│      Line L◇│ IL registered TM prima facie evidence of validity
│                                       Elan (GreenLight)
│  1         Nov 11, 1989  00:00   │dlk│     1│  │  │  │
│ RecL        Revised               By    CaseRec  Box1 2 3
│   Short L¶ │                                             │
╚════════════════════════════════════════════════════╝
```

Fig. 7

| CaseE | Xbt/Q# Hot% | LineE StatusE | Id(Trial, X/Q,Series) | Conf? | DateE | CheckBox 1-3 | Pic |
|---|---|---|---|---|---|---|---|
|  | 07 |  | Tasmanian Atlas: Greenlight village of 34 people |  |  |  |  |
| 1 | -75 | Shown | NDIL 07 |  | Apr 4, 1908 |  |  |
|  | 01 |  | GREENLIGHT Federal Trademark Registration ® 1,480,540 |  |  |  |  |
| 1 | 90 | Shown | NDIL 01 Complaint |  | Mar 15, 1988 |  |  |
|  | 02 |  | Specimen, First Use of Mark GREENLIGHT |  |  |  |  |
| 1 | 95 | Shown | NDIL 02 Complaint |  | Sep 15, 1986 |  |  |
|  | 03 |  | Current Product Label: GreenLight |  |  |  |  |
| 1 | 75 | Shown | NDIL 03 Complaint |  | Nov 6, 1989 |  |  |
|  | 04 |  | Defendant's Infringing Product Label |  |  |  |  |
| 1 | 80 | Shown | NDIL 04 Complaint |  | Oct 31, 1989 |  |  |
|  | 09 |  | States of actual use, Map. |  |  |  |  |
| 1 | 85 | Shown | NDIL 09 Preliminary |  | Oct 27, 1995 |  | Y |

Fig. 8

Fact Listing, By Cudgel  Elan (GreenLight)

| Status F | HotF±% | Date F | CaseF | Rec F | Box 1 2 3 |
|---|---|---|---|---|---|
| π has continuously advertised for Mark. | | | | | |
|  |  |  | 1 | 5 |  |
| Δ Received π The Nest Research Studies | | | | | |
| Stipulated | 75 | Jan 1, 1911 | 1 | 2 |  |
| Δ Received π Groking Endeavors Agreement | | | | | |
|  | 75 | Jan 2, 1911 | 1 | 3 |  |
| Δ claims possible use of mark in IL before 15Sep86 | | | | | |
| Contested | -80 | Sep 14, 1986 | 1 | 6 |  |

Fig. 9

| | Matters | | | |
|---|---|---|---|---|
| Cudgel Available | | GreenLight Software/ Elan Associates | | Feb 24, 1 |
| Matters Listed, by Cudgel | | | | Elan (GreenLi |
| π/Δ | Matter Title | | | |
| | Ball | Ball Due StatusM | DateM | Served |
| π | Complaint: Trademark Infringement, Misappropriation, Correct TM Register | | | |
| | | Filed | Mar 27, 1989 | Mar 27, 1989 |
| π | Preliminary Injunction | | | |
| | Ct | Briefed | | May 17, 1989 |
| Δ | Motion to serve over 20 interrogatories | | | |
| | | Continued | Jun 9, 1989 | Jun 2, 1989 |
| Δ | Motion to Compel Discovery & Adjurn π's Preliminary Injunction M | | | |
| | Δ | Decided | Jun 13, 1989 | Jun 9, 1989 |
| Δ | Counterclaim: Trademark Infringement & Abuse of Process | | | |
| | Ct | Answered | Jul 6, 1989 | Jun 16, 1989 |

Fig. 12

| | W<Exhibits | | | | |
|---|---|---|---|---|---|
| Cudgel Manual & Tutorial | | GreenLight Software/ Elan Associates | | | Nov 14, 198 |
| Witnesses with Exhibits, by Cudgel | | Elan (GreenLight) | | | |
| Witness's Name | | Party | | | LastDe |
| RecA | | | | | |
| Marked | Evidence Line | | | OffdBy | Admitt |
| Smith, Michael Heinlein | | W | | | Dec 17, 198 |
| 001 | GREENLIGHT Federal Trademark Registration ® 1,480,540 | | | π Y | 3 |
| 002 | Specimen, First Use | | | π N | 4 |
| 003 | Current Product Label: GreenLight | | | π Y | 5 |
| A | Defendant's Infringing Product Label | | | Δ Y | 6 |

Fig. 13

PERSUASION ORGANIZER AND CALCULATOR

This application is a continuation of Ser. No. 08/263,246 filed on Jun. 21, 1994, (abandoned Mar. 8, 1995) which was a continuation of Ser. No. 08/119,897 filed on Sep. 10, 1993, (abandoned Jun. 24, 1994) which was a continuation of application Ser. No. 07/635,757 filed on Dec. 31, 1990, (abandoned Sep. 30, 1993).

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to computer-aided persuasive argumentation and decision making, and more particularly to a tool to estimate the strength of a persuasive argument, to assist in making persuasive arguments stronger, to assist in the allocation of resources for a persuasive argument, and to assist in the organization of the components of a persuasive argument.

2. Background Art

The persuasion organizer and calculator assists anybody, especially litigating attorneys, required to evaluate a diverse set of evidence, apply that evidence to a set of rules, and persuade others—often a third party ("the factfinder") in the context of an adversarial contest (judge or jury)—of a position. Because clear understanding of one's own position is an essential prerequisite for rational persuasion, the present invention also assists the litigator in keeping chaotically changing information neatly organized during all stages of litigation.

Human cognition is limited. A fundamental cognitive limit is that human short term memory can hold only a half dozen chunks. (Herbert A Simon, Behavioral Invariants 17, 1990). In contrast, many human problem solving tasks require accurate perception, memory, evaluation, and retrieval of vast amounts of information.

A litigating attorney must collect and analyze a large number of potentially relevant facts, collect and analyze a large number of rules (case holdings and citations, statutes, regulations, and the like), and collect and analyze a large amount of evidence. The evidence may, to some extent, tend to make a fact more or less acceptable to the trier of fact. The facts, if accepted, may support a decision based on a given rule. The rules, if accepted as prevailing against a counter set of rules offered by adverse counsel, may persuade the judge or jury to decide in one's favor. And adverse counsel has a parallel task, to win support for its evidence, facts, and rules and to render its adversary's evidence, facts, and rules (EFR) less acceptable.

Even if precise probabilities were known, the mathematical task is difficult for unaided human cognition. But the probabilities of winning a positive decision are not simple, linear multiplications of the discrete probability of each element of a trial. Over the history of our legal system, certain distinct legal standards of proof have evolved. For example, in many civil trials, the plaintiff need only prevail on the basis of "the preponderance of the evidence"; in many criminal trials the prosecution must prevail "beyond a reasonable doubt." Other cases require "clear and convincing evidence." (Cf Dorothy K. Kagehiro & W. Clark Stanton, Legal vs Quantified Definitions of Standards of Proof, 9 *Law and Human Behavior* 159, June 1985; Terry Connolly, Decision Theory, Reasonable Doubt, and the Utility of Erroneous acquittals, 11 *Law and Human Behavior* 101, June 1987.)

These legal standards of proof—preponderance of the evidence, beyond a reasonable doubt, clear and convincing evidence—have been defined over centuries by common law and statute in words, not by mathematical probability estimates. The courts operate and instruct juries by these words. However, the rational litigator can better understand the strengths and weaknesses of his or her position by properly converting these verbal standards into mathematical estimates. Empirical studies have estimated the numerical values of these verbal descriptions as approximately 51%, 67% to 75%, and 90%, respectively. Kagehiro & Stanton at 160–161, 1985. Thus, under a "preponderance of the evidence" standard, remembered evidence which is at least 60% believable would be accepted, while the same evidence would fail under a "beyond a reasonable doubt" standard. The probability associated with a factfinder or judge believing any given evidence at a level to satisfy the applicable legal standard of proof may be termed as the legal probability.

Humans are often poor probability estimators. They don't learn well from experience. (Feest, Compliance with Legal Regulations: Observation of Stop Sign Behavior. 2 *Law & Soc Rev* 447, 1968.) Moreover, judgments are often biased by one's position in a trial. (Perter J. van Koppen. Risk Taking in Civil Law Negotiations. 14 *Law & Human Behavior* 151, 1990.) For a litigator to improve his or her judgment, an easy way of making predictions, saving the results of actual trial experience, and comparing predictions with final decisions is needed. With such information, a litigator may successively identify and reduce judgment biases, while improving his or her subjective legal probability estimates upon which resource allocation and litigation strategy are dependent. Subjective legal probability estimates are made by litigators to predict whether each piece of evidence will be sufficiently believed by the jury to satisfy the appropriate legal standard.

In any process of persuasive argumentation, all evidence need not prevail. Several parallel pieces of evidence may all serve to support a key fact. If only one item of evidence establishes that fact, that fact is not less established by the failure of the parallel evidence. Introducing additional evidence to support the same fact has two potential disadvantages. First, if the additional evidence is weaker than the primary evidence, it may cause the trier of fact to doubt the strength and validity of the primary evidence. Second, resources devoted toward gathering and introducing the secondary evidence are not available for other tasks in litigation.

An efficient litigator, therefore, seeks to obtain sufficient evidence to support all the facts and points of law needed to win and sufficient evidence to discount the facts and points of law the adverse party is expected to introduce. With limited resources of time, money, and human attention, there is a need for a guide to help indicate when sufficient evidence has been obtained to prevail on each issue in dispute. The present invention satisfies that need.

Trials are human endeavors, and the human frailties of perception, memory, communication, and sincerity were well known by Wigmore (Roalfe, 1977) and are well known by current judges and juries. Judges and juries do not simply add the pieces of evidence introduced by each side and award a judgment to the heavier side; nor are lawsuits decided by a random dart throw. Judges and juries are human, and within the limitations of human memory and judgment, they attempt to give a just decision. To successfully predict the judge or jury's decision, the litigator must consider the human frailties of the fact finder, as well as the fact finder's assessment of the sincerity and accuracy of the witness.

Moreover, triers of fact know that all witnesses are not perfectly honest. Even if a witness seeks to be honest, he or she may have misremembered the facts of some years ago. Even if the witnesses' memory is correct, the witness may not have correctly perceived the event in the first place. Bad lighting, poor hearing, illegible handwriting, ambiguous human communications all make the trier of fact's task difficult. The litigator's task of meeting his or her required legal standard of proof is, therefore, further complicated by attempting to predict the reactions of judge and jury and allocate scarce resources to those issues most in need of persuasive support.

To properly prepare for trial, an attorney must continually and routinely organize the evidence, facts, and rules; assess their likely impact upon the trier of fact; and compare his or her case to the evidence, facts, and rules of adverse counsel. If the evidence to support a key fact is early found to be weak, resources may be marshaled to gather additional evidence, to support alternative facts which would also lead to favorable judgment, to discover additional favorable rules, and to probe weaknesses in the opposition's evidence, facts, and rules.

Rote litigation practice is difficult enough. In simple cases, rote litigation practice may suffice. However, in more complex cases or when the stakes are high, additional information may be squeezed out of the litigator's documents, and if properly organized, analyzed, evaluated, and displayed, enable the dynamic analytic litigator to better allocate resources and to better predict the trial's outcome.

In addition to legal probability analysis, effective and successful litigation requires case management and several legal case management systems exist as prior art (for example, William S. Feiler, Litigation Support System and Method, U.S. Pat. No. 5,159,180). When legal case management is integrated with easy EFR legal probability analyses, case management makes the collection of the required legal probability information feasible and simple. Therefore, the persuasion organizer and calculator may be readily combined with a traditional legal case management system.

Because typical human decision making processes cannot adequately process the large amount of available information, humans often cannot find optimal solutions under conditions of uncertainty and risk. The prior art has sought to aid human decisionmaking by utilizing artificial intelligence theory and expert computer systems. The prior art has sought to replace the human decisionmaker by a computerized expert, utilizing a computerized knowledge base created and maintained by expert knowledge engineers, not lay persons. The typical expert system interviews the user, offers advice, and prescribes the best solution for the user. Hardy et al., Basic Expert System Tool, U.S. Pat. No. 4,803,641, 1989, at column 5.

The most difficult step in building expert systems involves encoding unstructured, often even unarticulated, knowledge into machine readable form. Hardy et al. '641 at column 1. The encoding process is performed by a "knowledge engineer" who must be adept at both the milking of knowledge from a human expert and the encoding of the knowledge into the machine readable expert system language. Id. Due to the lack of knowledge engineering tools based on a transparent, easily understandable expert system language, a person needs a good deal of formal education in computer science as well as specialized training in knowledge engineering to become a skilled knowledge engineer. Id.

To build an expert system it is far easier for the knowledge engineer to become a pseudo-expert in the knowledge domain of the human expert than it is for the human expert to learn knowledge engineering and directly encode his or her knowledge into machine readable form. Id. The knowledge engineer does most of his or her work in the expert system computer language. Id. at col. 6. Typical expert system knowledge base languages have included the intricate PROLOG and lower level assembly language. Id.

Traditional expert systems are centrally dependent on the skills of a professional knowledge engineer. The knowledge engineer creates the knowledge base computer file and then debugs it. Id. at col 5. The knowledge engineer writes facts and rules into the knowledge base. Id. As the expert system is tested in consultation mode, the engineer traces the flow of inferences and conclusions. Id. Additional commands allow the knowledge engineer to add or remove entries from the loaded knowledge base. Id.

During the consultation mode of an expert system, the consultation user receives advise from the computerized system. Id. The expert system asks the user questions and the user is to supply the required information, in the order as requested by the computer. Id.

In summary, a traditional expert system is designed and programmed by a professional knowledge engineer. The knowledge engineer seeks to embody in the computerized knowledge base what the knowledge engineer can learn of the rules and facts of the subject matter. During the consultation mode, the expert system controls the questions and answers given to the lay user. While the lay user may be able to ask the computerized expert system the reasons for the computer's advise, the lay user cannot directly modify the knowledge base, its inferential logic, nor any of its programming. If the lay user does not agree with the expert system, he can address his concerns to the knowledge engineer, but the lay user cannot directly modify or even "tune" the traditional expert system. Under traditional expert systems, the lay user, or the expert user—a non-computer professional—is passive and only receives advise constructed by the professional knowledge engineer. The prior art teaches away from the present invention.

In marked contrast to traditional expert system design, which seeks to train lay users to use expert systems designed and augmented by knowledge engineers, the persuasion organizer and calculator makes computer-assisted organization and calculation accessible to the lay user. In the present invention, the knowledge base and its logic are directly accessible and definable by the lay user. The major function of the present invention is not to give the system user advice gathered from other experts, but to organize the information the system user knows, calculate the logical implications of the known information, and readily present the results to the system user. In essence, the system user becomes his or her own expert, defining their own knowledge base and persuasive calculus.

Because most models underrepresent reality, the system user him or her self is able to access the extent to which the model comports with their own intuitive sense. For example, the system user is able to assign and modify his or her subjective legal probability estimates based on his or her intuition. Furthermore, the system user of persuasion organizer and calculator has constant access to modifying the logic and linkages of the knowledge base and persuasion calculus, as well as to the parallel resource allocation decision. Therefore, the system user, even though not an "expert" or a knowledge engineer has the full capability to modify and design the persuasion organizer and calculator without the need for a "knowledge engineer," as required by prior art expert systems—he or she is a "non-expert" system user.

If the system user doesn't like the results the persuasion organizer and calculator shows and the logic and persuasion calculus are believed valid, likely choices are then to devote more resources to finding additional supporting evidence and case law, or, depending on the cost/benefit analysis, seek settlement of the dispute. Contrary to the traditional expert system, which assumes a fixed state of the world, the present invention recognizes the constantly changing and difficult-to-predict world of persuasive argumentation.

Fundamental to both to the present invention and traditional prior art expert systems is the recognition of the powerful but still limited cognitive abilities of the human mind. Expert systems seek to replace lay user decisionmaking with the "expert" prescription of a computer. The present invention seeks to help the system user more fully utilize his or her own decision-making and judgment abilities, reducing the cognitive complexity by appropriate, flexible organization and calculation, completely under the system user's control.

SUMMARY OF THE INVENTION

It is a primary objective of the present invention to provide computer-assisted decision-making and persuasive argument analysis for a lay user who creates, modifies, and fully controls the system without the need for a knowledge engineer.

Another objective of the present invention is to provide a structure with which a litigator can create a decisional framework for a persuasive argumentation process and predict the likely outcome of non-linear human thought processes.

It is another objective of the present invention to provide an aid for attorneys and others involved in persuasive and adversarial endeavors, in order to: determine accurate legal probabilities for the acceptance of evidence, facts, and rules; permit learning from past legal probability assessments as compared with judge and jury decisions; permit ready identification of weak links in the legal persuasion process-both of one's own side to allocate resources for strengthening and of the adverse side to allocate resources for attacking; and have a neat, well ordered display of the elements of a persuasive legal argument.

Yet another objective of this invention is to allow simple, non-expert modification of all aspects of a knowledge base and persuasive calculus.

Another objective of the invention is to provide to the litigator clean, neat, comprehensive lists of hierarchical interrelated data.

A final objective of the present invention is to eliminate ambiguity and confusion between system users, knowledge engineers, and experts while providing a direct link between a system user and the system components.

BRIEF DESCRIPTION OF THE DRAWINGS

Other objects and advantages of the present invention will become apparent upon reading the following detailed description and upon reference to the drawings in which:

FIGS. 2 through 23 are pictorial diagrams of components of the invention in one preferred embodiment ("CUDGEL") when the persuasion organizer and calculator is operated using a "HELIX" database platform on a "MACINTOSH" personal computer.

FIG. 2 is a pictorial diagram showing the interactively dynamic knowledge base collection of Relations and Users.

FIG. 3 is a pictorial diagram showing the interactively dynamic knowledge base Global Inputs: Title/Date Window (including user inputs for subjective legal probability and legal standard of proof).

FIG. 4 is a pictorial diagram showing the top of the interactively dynamic knowledge base Evidence Window (including user inputs for evidence characteristics).

FIG. 5 is a pictorial diagram showing two samples (in which evidence is accepted, FIG. 5a (upper) and rejected, FIG. 5b (lower)) of the bottom of the interactively dynamic knowledge base Evidence Window (including user inputs for the legal standard of proof and subjective legal probabilities).

FIG. 6 is a pictorial diagram showing the interactively dynamic knowledge base Fact Window (including user inputs for fact characteristics).

FIG. 7 is a pictorial diagram showing the interactively dynamic knowledge base Law Window (including user inputs for law characteristics).

FIG. 8 is a pictorial diagram of the interactively dynamic knowledge base Evidences Window showing a display of hierarchically defined evidences variables.

FIG. 9 is a pictorial diagram of the interactively dynamic knowledge base Facts Window showing a display of hierarchically defined facts variables.

FIG. 10 is a pictorial diagram of the interactively dynamic knowledge base Laws Window showing a display of hierarchically defined laws variables.

FIG. 11 is a pictorial diagram of the interactively dynamic knowledge base Issues Window showing a display of hierarchically defined issues variables.

FIG. 12 is a pictorial diagram of the interactively dynamic knowledge base Matters Window showing a display of hierarchically defined matters variables.

FIG. 13 is a pictorial diagram of the interactively dynamic knowledge base Witnesses with Exhibits Window showing a display of hierarchically defined and related witnesses and exhibits variables.

FIG. 14 is a pictorial diagram of the interactively dynamic knowledge base Facts from Evidence Window showing a display of hierarchically defined and related facts and evidence variables.

FIG. 15 is a pictorial diagram of the interactively dynamic knowledge base Laws from Facts Window showing a display of hierarchically defined and related laws and facts variables.

FIG. 16 is a pictorial diagram of the interactively dynamic knowledge base Issues from Laws Window showing a display of hierarchically defined and related issues and laws variables.

FIG. 17 is a pictorial diagram of the interactively dynamic persuasive calculus Logical Evidence Subjective Probability Calculation, 2EvEst+.

FIG. 18 is a pictorial diagram of the interactively dynamic persuasive calculus Multiplied Evidence Subjective Probability Calculation, 2EvEst %.

FIG. 19 is a pictorial diagram of the interactively dynamic persuasive calculus Truth Standard Threshold Calculation for Evidence, IsEvTruthE+.

FIG. 20 is a pictorial diagram of the interactively persuasive calculus Accuracy Proof Threshold Calculation for Evidence, IsEvAccur+.

FIG. 21 is a pictorial diagram of the interactively dynamic persuasive calculus Proof Threshold Linkage, GetProof % E.

FIG. 22 is a pictorial diagram of the interactively dynamic persuasive calculus Customized Threshold Acceptance Linkage, GetSet % E.

FIG. 23 is a pictorial diagram of the interactively dynamic persuasive calculus 100/E Abacus used for standard calculation and display purposes.

FIG. 24 is a flowchart diagram showing the general physical layout of the persuasion organizer and calculator (flowchart boxes 1–15).

FIG. 25 is a flowchart diagram showing the operation of the persuasion organizer and calculator and the relation between the interactively dynamic knowledge base and interactively dynamic persuasive calculus (flowchart boxes 20–45).

FIG. 26 is a flowchart diagram showing the process for setting the standard of proof in the interactively dynamic knowledge base (flowchart boxes 50–57).

FIG. 27 is a flowchart diagram showing the process for assigning probabilities in the interactively dynamic knowledge base (flowchart boxes 60–74).

FIG. 28 is a flowchart diagram showing process for evaluating evidence within the interactively dynamic persuasive calculus (flowchart boxes 80–83).

DESCRIPTION OF THE PREFERRED EMBODIMENT

The preferred embodiment of the present invention was initially programmed in "DOUBLE HELIX," a data based management environment for the Apple "MACINTOSH" computer. "DOUBLE HELIX" is a non-procedural, non-hierarchical, iconic, object-oriented programming language; there is no command line source code. (Computer Program Written in On-Screen Icons Copyrighted, *Guide to Computer Law* ¶60,011, Jun. 8, 1989.) A copy of the full source code is enclosed on the enclosed computer disk; key aspects of the source code are presented below and in the accompanying paper documentation.

A hundred page manual has been written for the first version of the preferred embodiment of this invention (CUDGEL v1.02 Manual) and is incorporated herein by reference. It, together with the widely available instruction manuals for the "MACINTOSH" computer (Apple Computer, Inc., Cupertino Calif.) and "DOUBLE HELIX" database software User's Guide and Reference Manual (Helix Technologies, Northbrook, Ill.), can readily permit an ordinary "DOUBLE HELIX" programmer to understand and build, with the commercially available "HELIX" software platform, the basic "CUDGEL" v1.02 structure. The system user of the invention, however, need not be a "HELIX" programmer. Software application platforms other than "DOUBLE HELIX" and computers other than Apple's "MACINTOSH" could also be utilized by this invention, although the "MACINTOSH" and "HELIX" platforms currently appear the most powerful, flexible, and user-friendly combination.

By providing a clear yet comprehensive structure, virtually all of the critical data for litigation may be readily entered into the computer system. By use of a graphic user interface, such as the "MACINTOSH" computer, the system user is provided with easy data entry. (See "CUDGEL" v 1.02 Manual pages 23–41; note some calculation elements for this invention have been added since the v 1.02 manual was written.) Using the relationally linked lists and associated queries, the system user can readily retrieve neat, clean, comprehensive lists on any aspect of the litigation. (See "CUDGEL" v1.02 Manual pages 42–50.)

Figure 1:
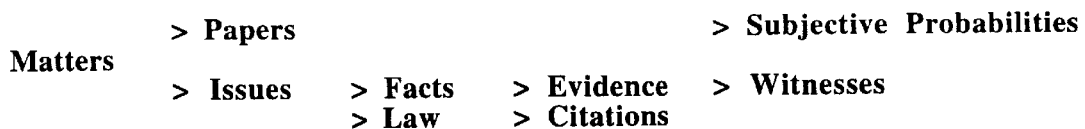
FIG. 1 is a schematic drawing of the Persuasion Calculus Logical Model.

FIG. 1 shows a schematic drawing of the logical model of the preferred embodiment of the Persuasion Organizer and Calculator ("CUDGEL"). Much litigation focuses on Statements of Law and proving Facts. Witnesses introduce Evidence; Evidence supports Facts; Facts and points of Law support Issues; Issues define Matters to be decided by the court; Papers are filed to influence the decisions on various Matters.

Figure 2:
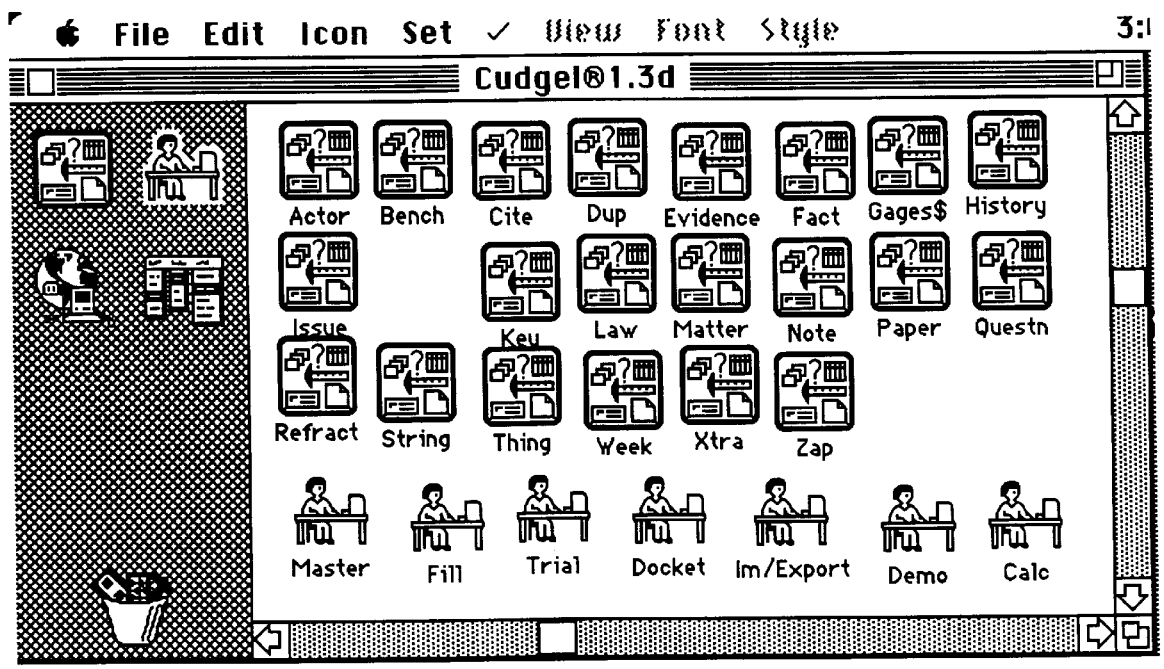
Figure 3:
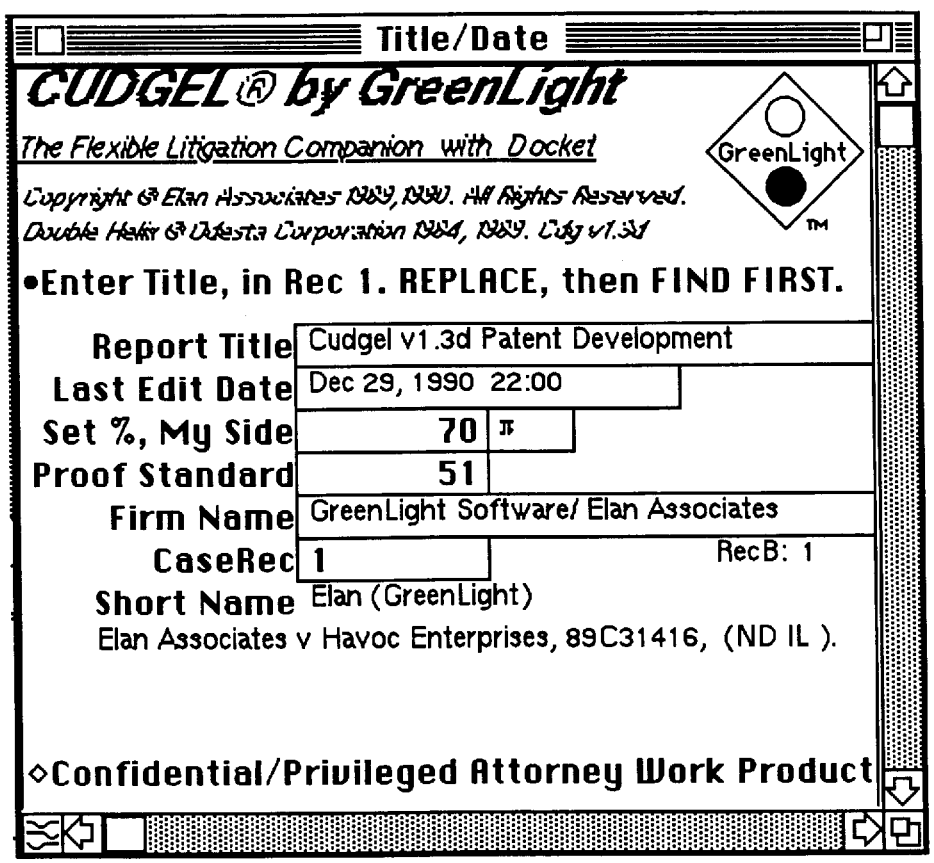
Figure 10:
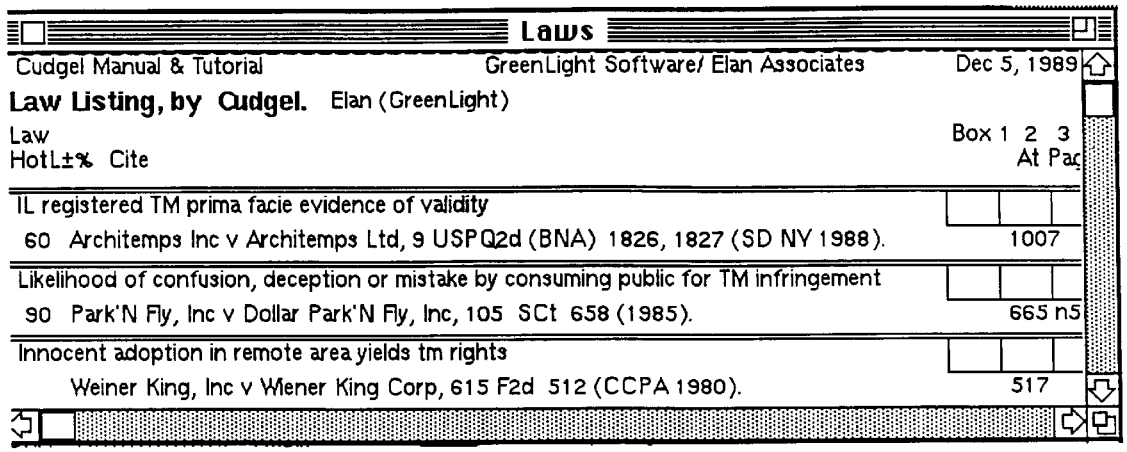
Figure 11:
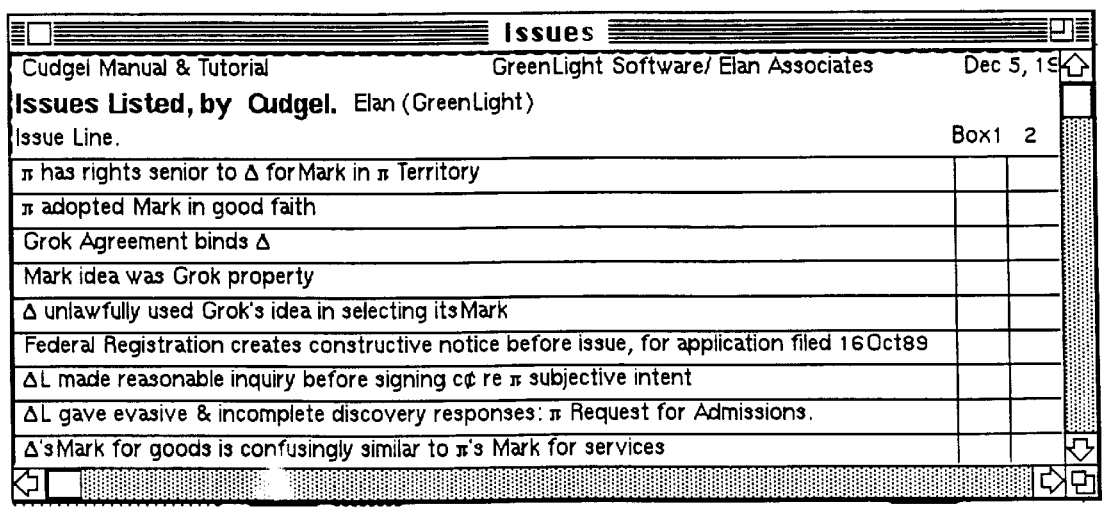
Figure 14:
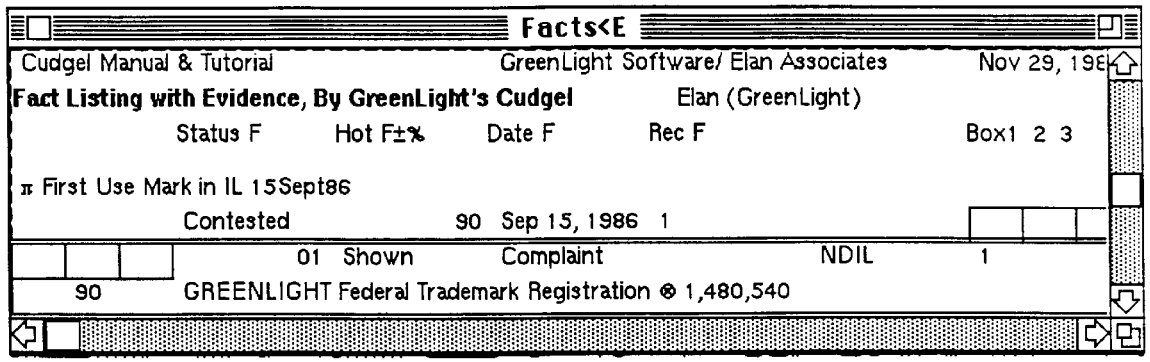
Figure 15:
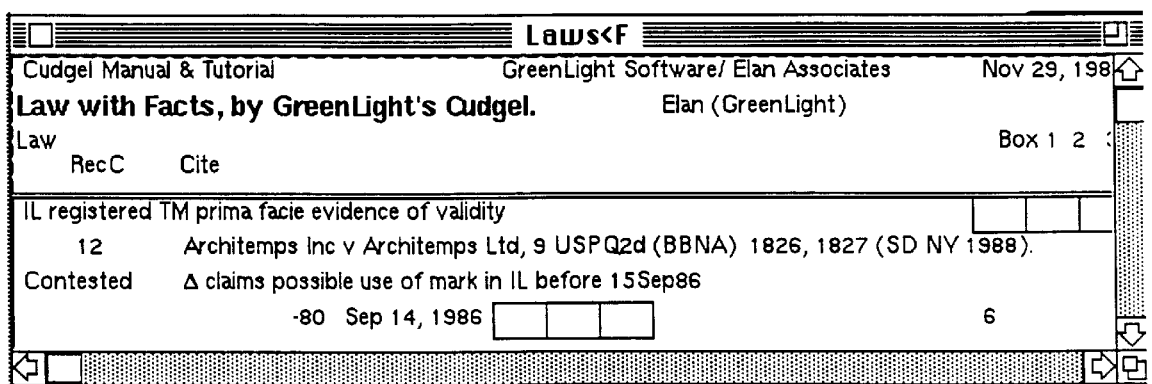
Figure 16:
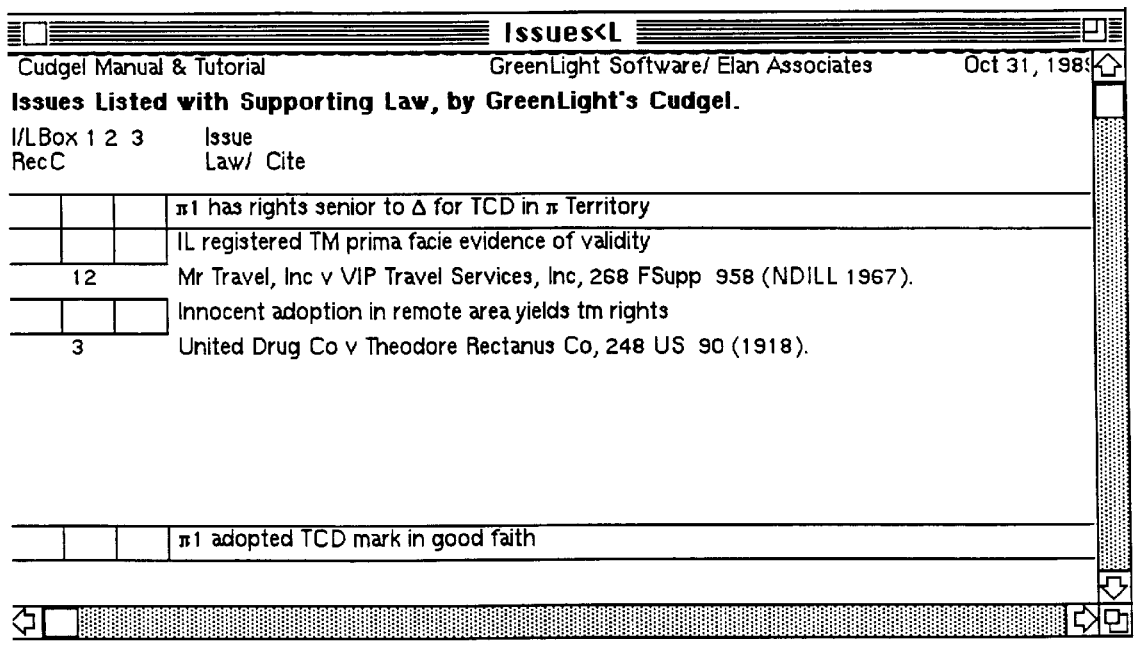

FIG. 2 shows a complete listing of the relational, hierarchically defined variables, ranging from Actor to Zap, of the preferred embodiment. The hierarchical and relational aspects of this invention permit the various key litigation elements to be shown in functional slices of the underlying data matrix. (See "CUDGEL" v1.02 Manual pages 50–55.) Witnesses for Exhibits and Exhibits for Witnesses (FIG. 13) may be shown; Evidence supporting Facts (FIG. 14), Facts supporting Laws (FIG. 15), Laws supporting Issues (FIG. 16), and Papers supporting various Matters may all be readily seen. Opposing facts, evidence, laws, and papers may also be programmed in parallel fashion (FIG. 6, "-F Pair field").

One of the key tasks of the litigator is to ensure that he or she has evidence for each needed fact and facts for each point of law (FIGS. 4,6,7). Moreover, the litigator may attempt to have more persuasive evidence than the opposition, which has its own set of facts. Some combination must be used to estimate how the fact finder will evaluate the conflicting set of evidence.

Figure 25:
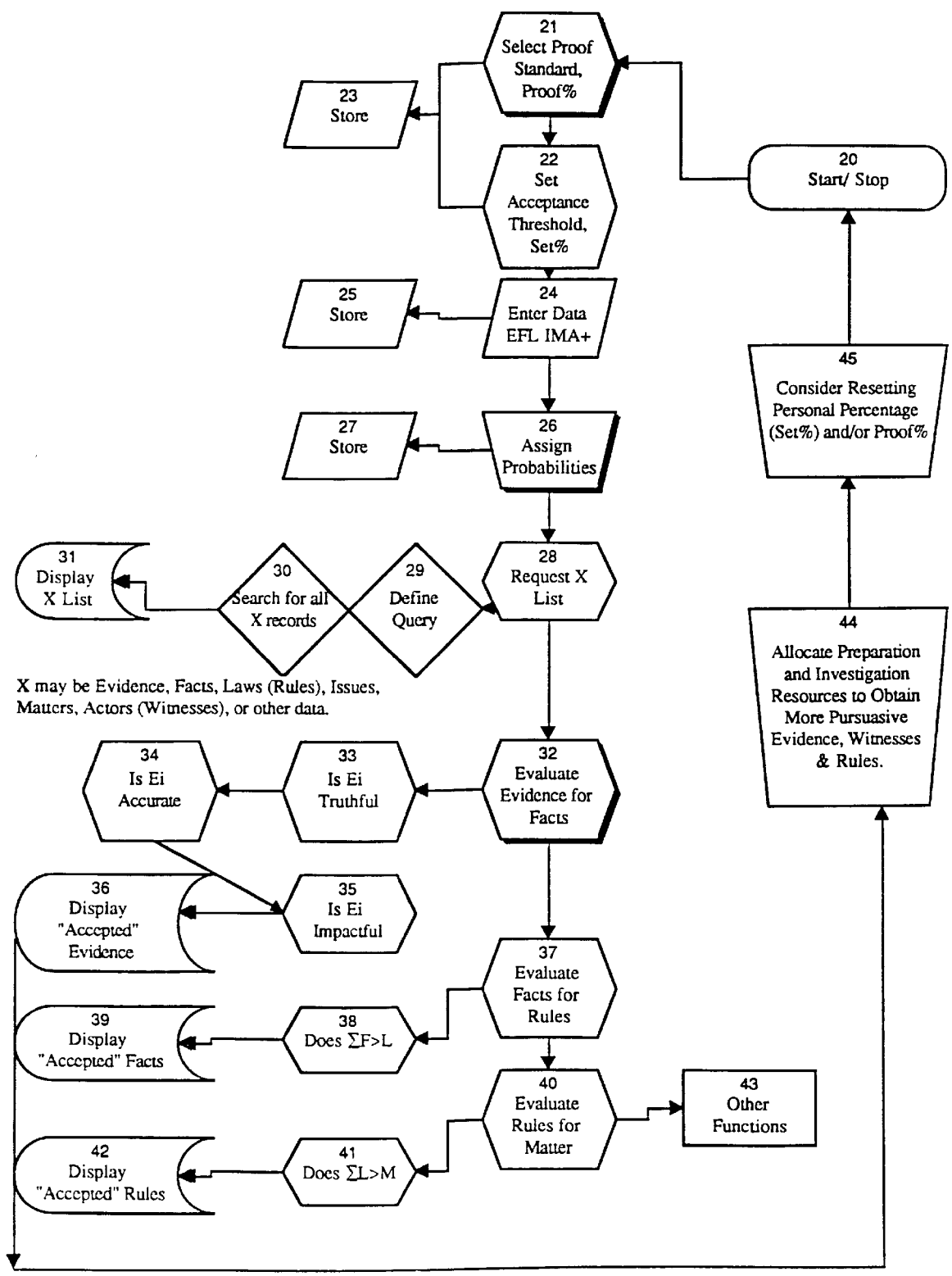
Figure 27:
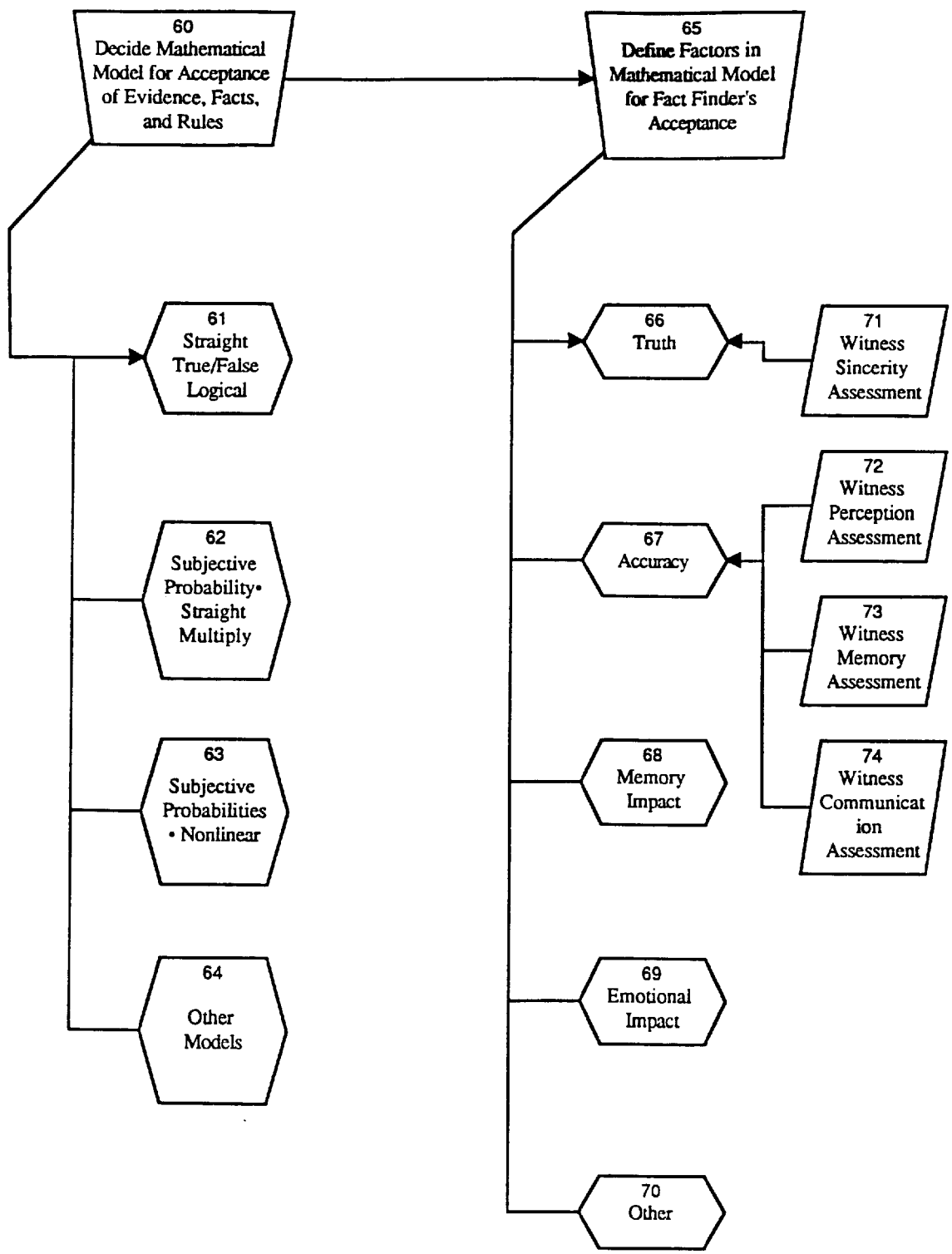
Figure 28:
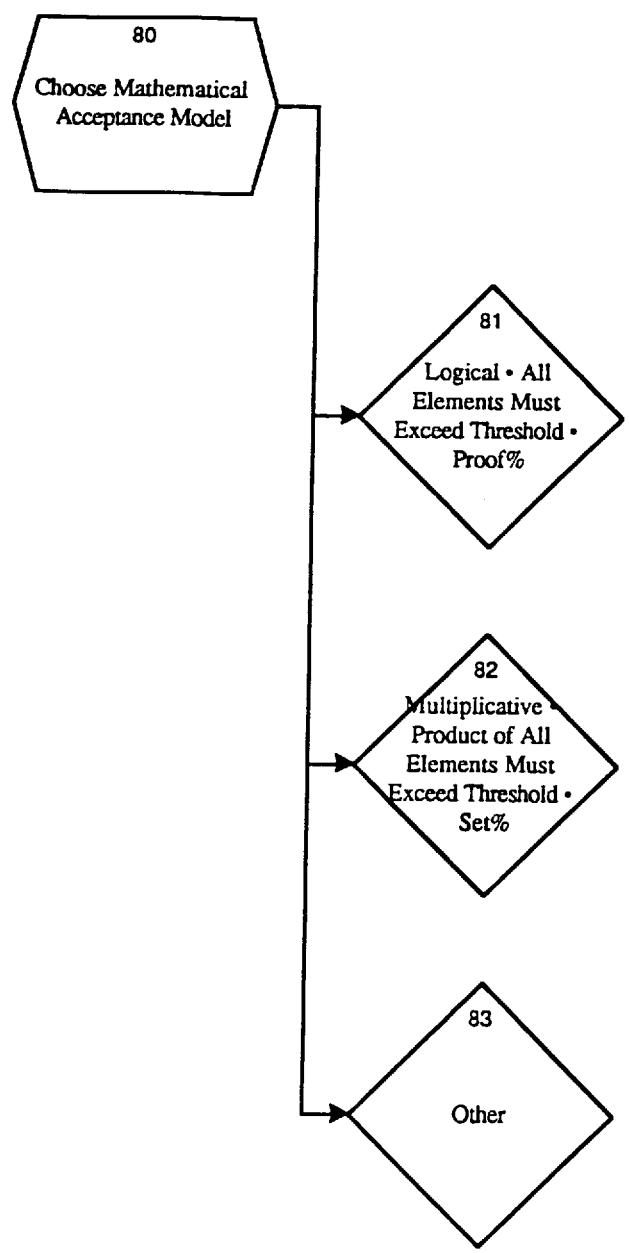

FIG. 25 discloses the major processes of the invention. The process starts at block 20, with the persuasion organizer and calculator allowing the system user to select the appropriate legal standard of proof (Proof %), based on the type of case (block 21 and FIG. 26, blocks 50–54). Criminal trials in the United States require a higher legal standard of proof than common civil matters. Whatever the legal standard of proof selected, the invention allows a system user to choose their own threshold, or subjective legal probability (Set %), at which they predict the fact finder will accept a data element as true (FIG. 25, block 22). The appropriateness of a given threshold will be influenced by the decisional framework chosen by the system user (FIG. 27, blocks 60–64; FIG. 28, blocks 80–83). Multiplicative models yield lower scores than straight true/false logical models. The invention then makes the appropriate standard of proof a part of the interactively dynamic knowledge base.

Figure 24:
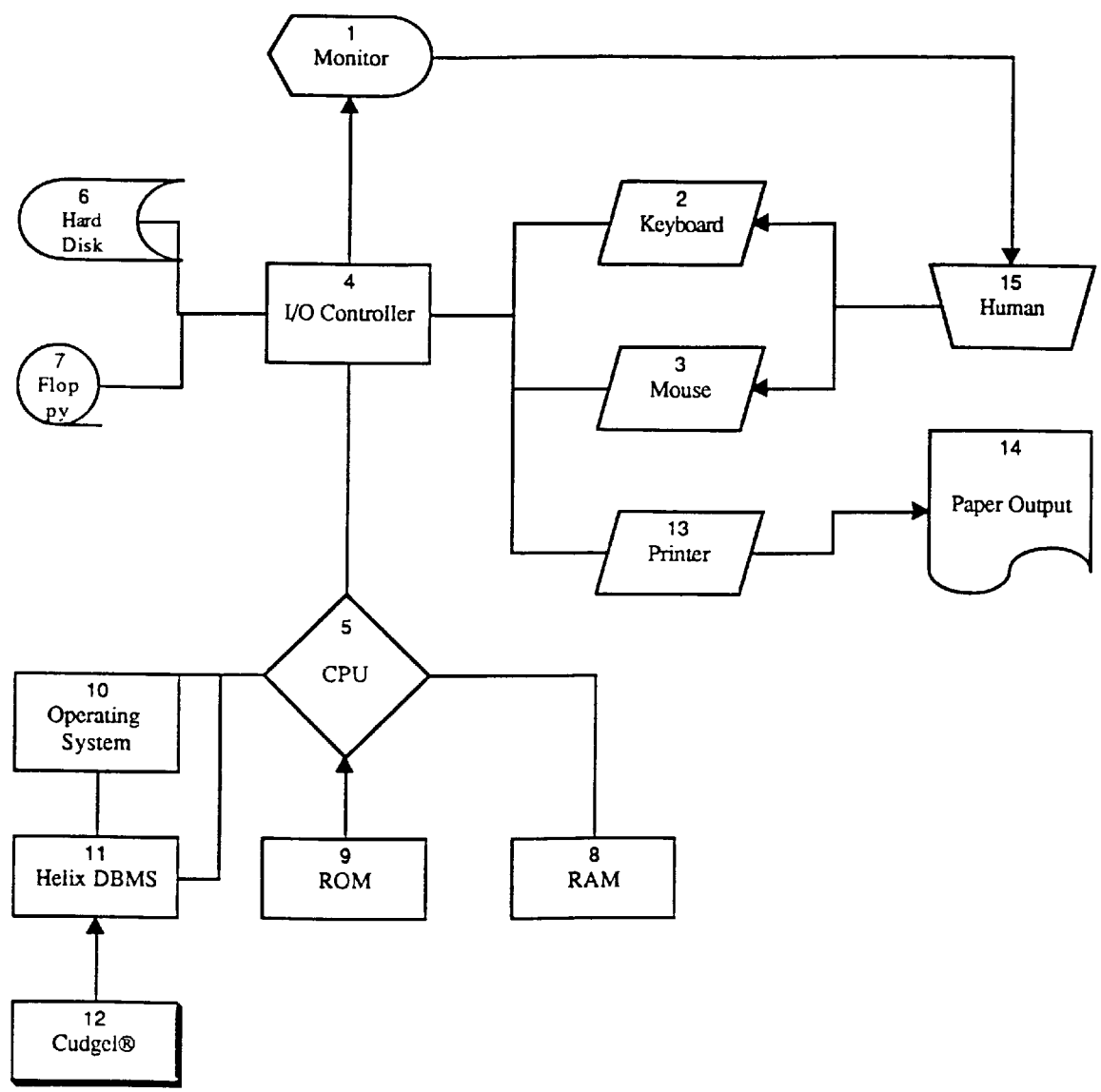
FIGS. 24 through 28 are flowchart diagrams showing various processes utilized in one specific embodiment of the persuasion organizer and calculator ("CUDGEL") using a "HELIX" database platform on a "MACINTOSH" personal computer.

The invention then allows the system user to enter the data of the litigation into the interactively dynamic knowledge base of the calculator (FIG. 25, block 24), generally using the keyboard (FIG. 24, block 2) and mouse (block 3), although direct entry by floppy disk (block 7) or multitasking computer operating another program (RAM in block 8) are also feasible. Data on Evidence, Facts, Laws or rules, Issues, Matters, Actors or Witnesses, and other elements of the persuasion process may all be entered (EFL IMA+) and stored (block 25). A convention of the invention is that the user defines evidence, facts, laws, and the like that support his or her position as positive and those that counter the position as negative. The adverse attorney, if using this invention, would usually assign positive and negative values in reverse order to the same evidence, fact, or law.

The invention then allows the user to view a display of each relevant data element entered, such as evidence, and calculates the legal probabilities (block 26). Depending on the complexity of the decisional framework chosen by the system user, the legal probabilities may range from a single estimate of the acceptance of that item of evidence as the truth, to multidimensional models estimating witness sincerity (block 71), witness perception (block 72), witness memory (73), witness communication ability (block 74), the memory impact of the fact finder struggling to remember all the testimony and exhibits (block 68), and the emotional impact of the evidence (block 69). The invention stores the calculated legal probabilities in association with their evidence data (block 27) in the interactively dynamic knowledge base.

The invention next allows the system user to link to each fact to be proved the relevant evidence. This is done by the conventional data base method of entering in a field of the data record for each evidence element a pointer (record number) identifying the fact to be proved. Likewise the system user links to each point of law or rule those facts that must be proved for the rule to be invoked. Finally, the system user links to each issue to be decided the rules that must be found applicable and supported by the factual findings and evidence. The invention stores the links between the hierarchically defined variables in the interactively dynamic knowledge base.

The invention next evaluates whether a hierarchically-higher level variable is found to be true using a mathematical model chosen by the computer user and defined in the persuasion calculus. For example, to evaluate whether a fact will likely be found true, the invention will calculate the legal probabilities of the lower level dimensions of the system user's chosen decisional framework, including facts and evidence. If the system user chooses a straight true/false logical model, underlying facts necessary and sufficient to satisfy the applicable legal standard of proof must be found to be true. On the other hand, if a subjective probability straight multiplicative model is chosen, the product of all evaluated dimensions must reach or exceed the acceptance threshold, Set %, based on the appropriate legal standard of proof.

For example, FIG. 5a (upper) shows one estimate of the persuasive variables Truth (90%), Accuracy (90%), and Impact (90%) for a combined multiplicative acceptance of 81%. Since 81% is greater than the applicable legal standard of proof (51%, preponderance of the evidence) that item of evidence is predicted as accepted as true. That item of evidence is also predicted as accepted as true if a Set % (discussed below) acceptance threshold of 70%, for example, is used. FIG. 5b (lower) shows another estimate of Truth (20%), Accuracy (30%), and Impact (80%) for a combined multiplicative acceptance of 6%. Since 6% is less than the legal standard of proof (51%), that item of evidence is predicted as accepted as false.

The interactively dynamic persuasive calculus automatically calculates equations that are to be displayed on active windows of the computer monitor (block 1). Therefore, if evidence probabilities (blocks 26, 66–70) are entered and no such programmed fact window is displayed, then the evidence probability data is simply stored in RAM (block 27). However, if a window is actively displayed showing the evidence relevant to a given fact, then after the entry of a relevant evidence datum and its probabilities, the computer CPU (block 5) may be instructed to evaluate the evidence for the given fact (blocks 32–35, 38, 39) and display the accepted fact (block 39). Similar hierarchical calculations may store and display whether a rule is accepted (blocks 40–42), how a contested issue may be decided, and the like.

After data are entered (blocks 21, 22, 24, 26), acceptances are predicted (blocks 32–42), and the results are displayed (blocks 31, 34, 36, 39, 42) via monitor (block 1), printer and paper (block 13 and 14), or other means, the invention may reassess any of the user controllable elements of the simulation and calculation: assigned subjective legal probabilities (block 26), acceptance threshold (block 22), appropriate legal standard of proof (block 21), and the underlying decisional framework (blocks 60–74, 80–83). The invention allows calculations to be made under different parameter settings (block 45) and resulting in the "tuning" of the decisional framework to maximize performance.

To calibrate litigators and tune the decisional framework, the invention allows the system user to enter data from cases already decided. This is best done with cases the litigator or his or her firm has been involved with, but may also be done with well selected published cases. As a litigator utilizes the case management functions of this invention (blocks 28–31, 43), final judgment data against which decision models and probability assessments may be tested will be automatically collected. With time and accumulated data, highly accurate prediction of key decision making model parameters may be made for judges, expert witnesses, arbitrators, insurance adjusters, legislators, and the litigators themselves.

Figure 17:
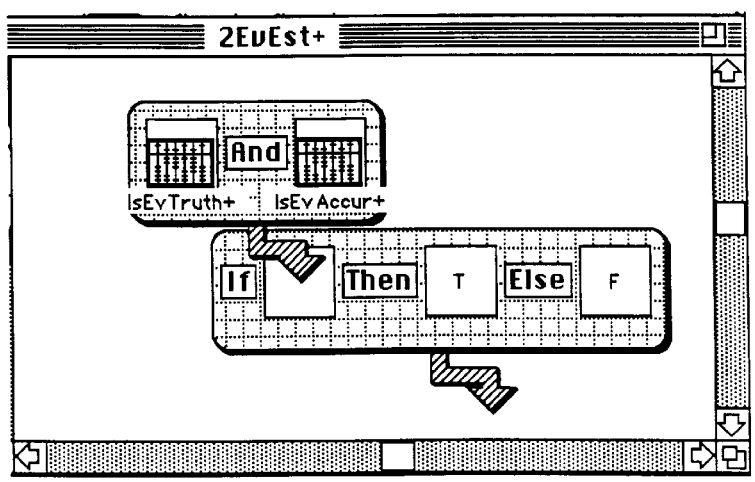
Figure 18:
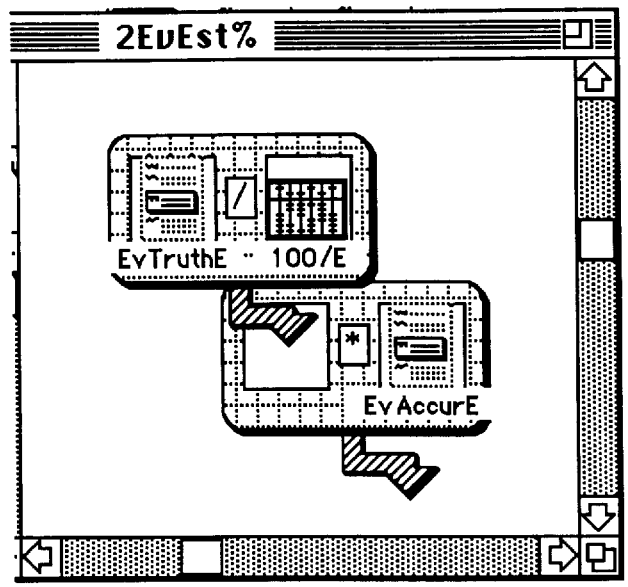
Figure 19:
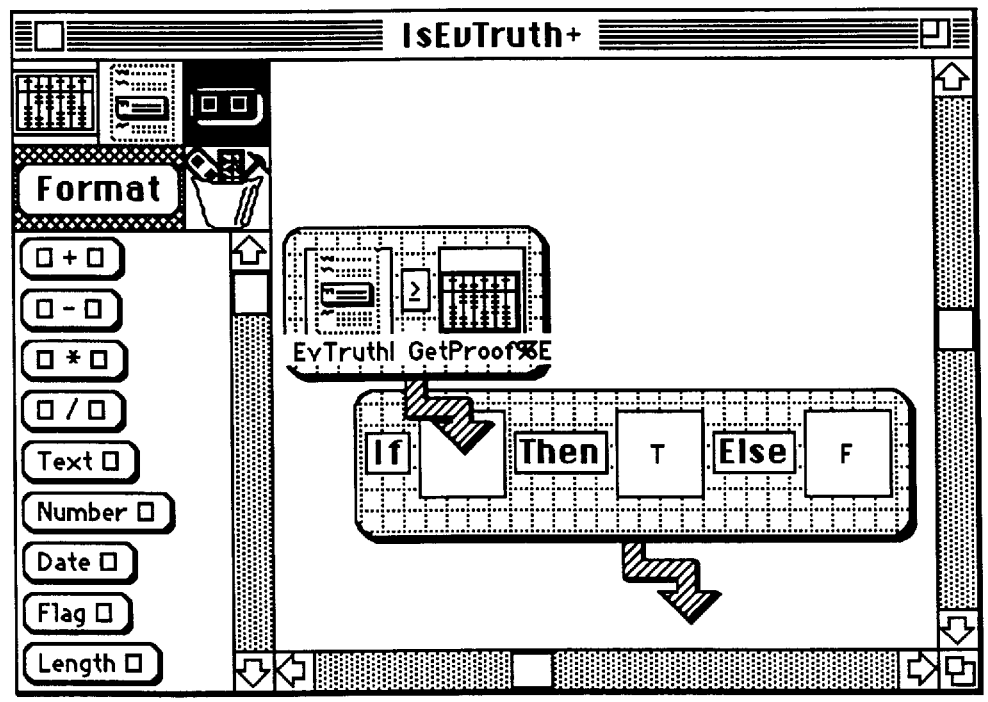
Figure 20:
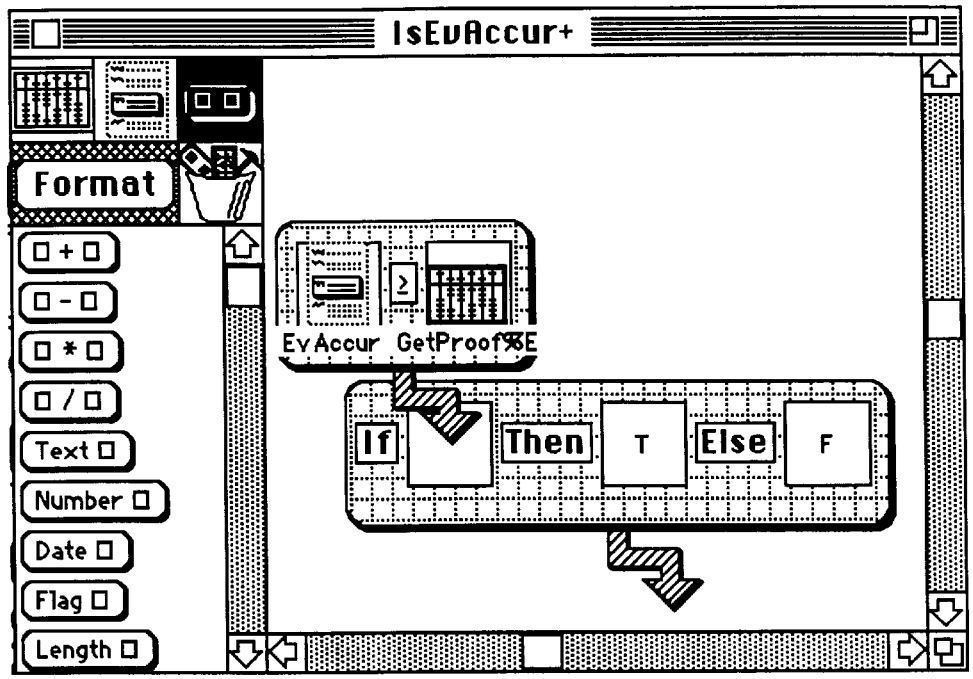
Figure 21:
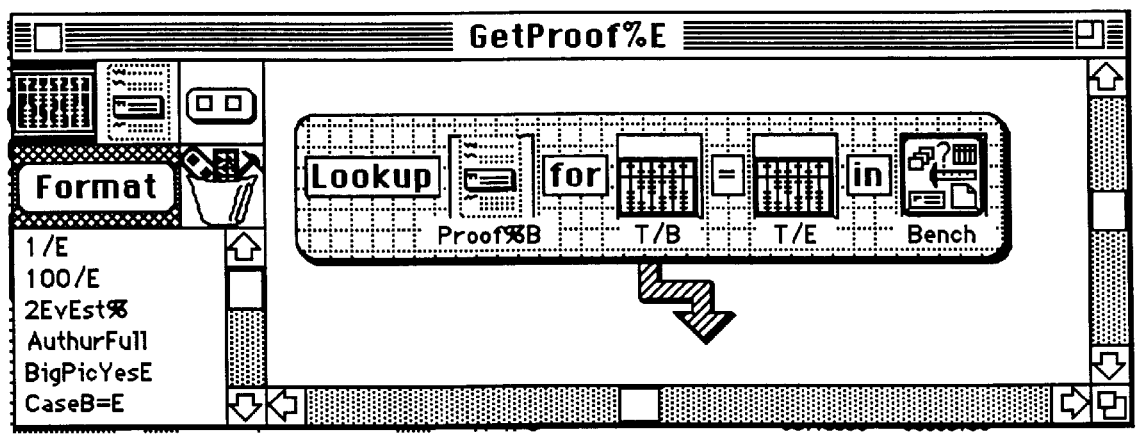
Figure 22:
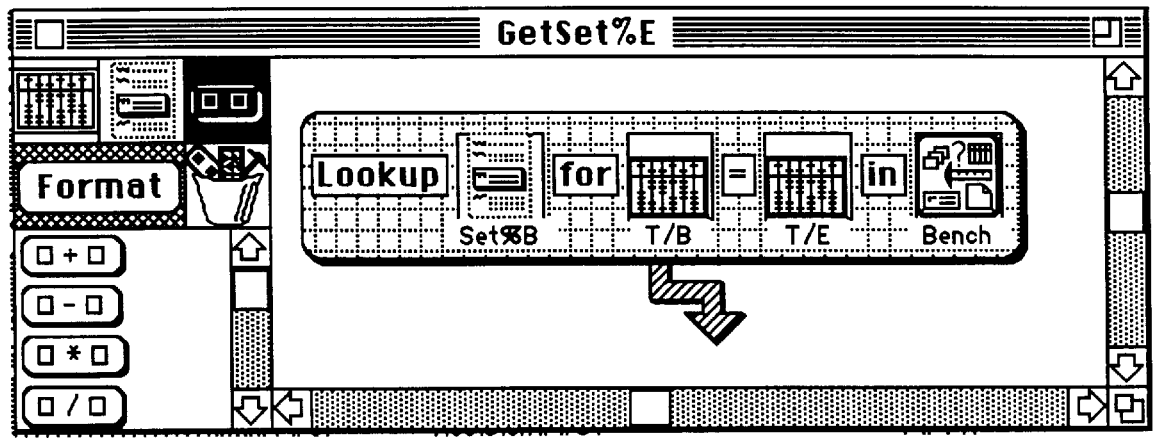
Figure 23:
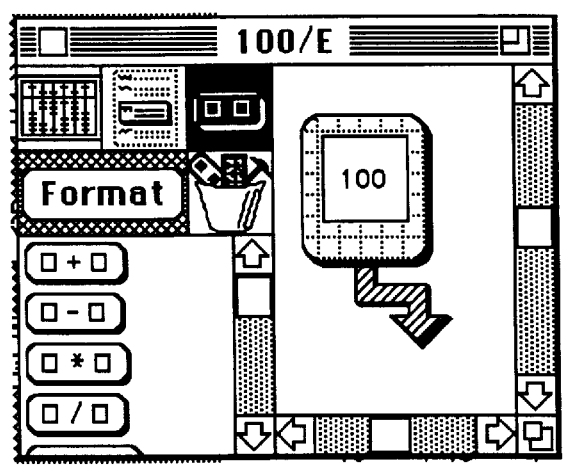

Evaluations of dimensions of evidence may be done by True/False logic (FIG. 17), by multiplication of legal probabilities (FIG. 18), or by other mathematical models. The invention provides these two common models (FIG. 28). The logical model requires that both truth and accuracy be true for the evidence to be accepted as true. The multiplication model simply multiplies the legal probabilities of truth and accuracy. The interactively dynamic persuasive calculus contains the two fundamental decision making models—logical true/false and multiplicative subjective probability. Because of the user-friendly graphic user interface of a data base platform such as "HELIX", alternative persuasive variables and elements (blocks 32, 70) and alternative decisional frameworks (blocks 60, 63, 64, 83) may readily be employed using this invention.

Figure 26:
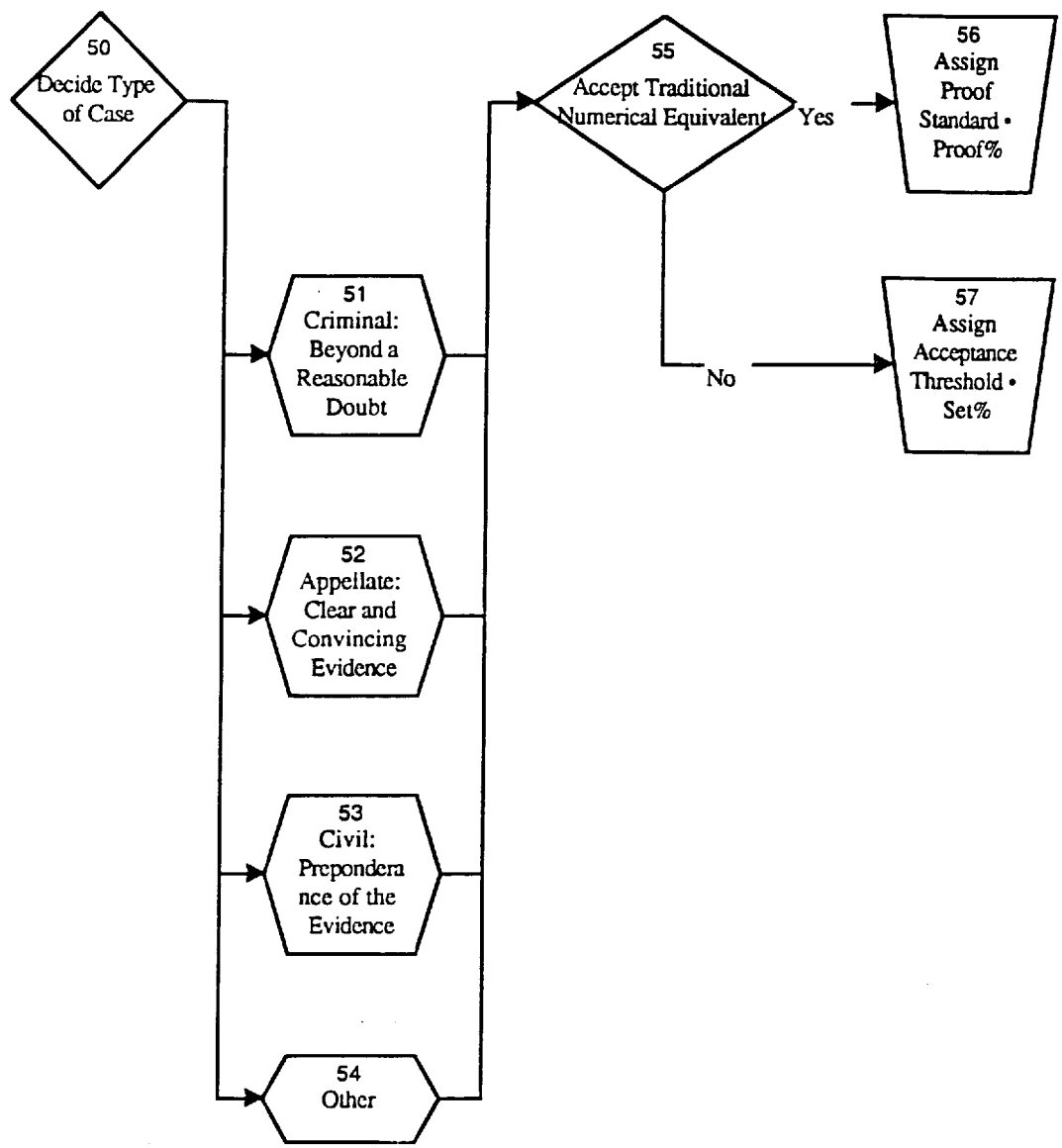

Because a series of percentages can readily become a small number, the invention allows the system user to set his or her own subjective legal probability acceptance levels. For example, a 90% rating for Truth, Accuracy, Memory Impact and Emotional Impact falls to an overall 64% rating; a four series of 75% factors falls to 32%. Depending on the sophistication and numerical behavior of the combination model the user wishes to employ, the proper threshold for acceptance or rejection of a persuasive element may simply be the standard 51%, 67%–75%, 90% level, or may be adjusted, either linearly, multiplicatively, exponentially, or by any other model the user chooses (FIG. 26). Assessing subjective legal probabilities accurately is a difficult skill, which often can be improved. Improvement requires review of past estimates and comparison with actual outcomes. This invention makes the collection, review, revision, and analysis of such subjective legal probability estimates feasible.

The invention further allows the system user to readily add customized calculations to those provided in the interactively dynamic persuasive calculus in the preferred embodiment. For particular types of litigation, the system user may can supplement the basic Truth and Accuracy dimensions with additional or alternative dimensions.

From a mass of conflicting evidence, this invention readily permits the litigator to obtain neat, orderly listings of facts likely to be accepted as true, of rules based on those supporting facts likely to be invoked, and of which way contested issues are likely to be decided (blocks 36, 39, 42). If the litigator does not like the predicted outcome, litigation resources may be redeployed to obtain more credible witnesses, to discovery additional evidence, to research supporting law, and the like (block 44).

While a specific embodiment of the invention has been shown and described, it is to be understood that numerous changes and modifications may be made therein without departing from the scope, spirit, and intent of the invention as set forth in the appended claims.

REFERENCES

Apple Computer, Inc, *Macintosh SE Owner's Guide*, Apple Computer, Inc, Cupertino, Calif., 1988.

Computer Program Written in On-Screen Icons Copyrighted, *Guide to Computer Law* ¶60,011, Jun. 8, 1989.

Connolly, Terry, Decision Theory, Reasonable Doubt, and the Utility of Erroneous acquittals, 11 *Law and Human Behavior* 101, June 1987.

Feest, Compliance with Legal Regulations: Observation of Stop Sign Behavior. 2 *Law & Soc Rev* 447, 1968.

Feiler, William S., Litigation Support System and Method, U.S. Pat. No. 5,159,180, issued Oct. 27, 1992.

Hardy, Steven et al., Basic Expert System Took, U.S. Pat. No. 4,803,641, issued Feb. 7, 1989.

Helix Technologies, *Double Helix User's Guide and Reference Manual*, Odesta Corporation, Northbrook, Ill.

Kagehiro, Dorothy K. & W. Clark Stanton, Legal vs Quantified Definitions of Standards of Proof, 9 *Law and Human Behavior* 159, June 1985

Kegan, Daniel. *Cudgel Manual*, v1.02, 1990.

Roalfe, William R. John Henry Wigmore: *Scholar and Reformer*. Northwestern University Press, 1977.

Simon, Herbert A., Invariants of Human Behavior, 41 *Annu. Rev. Psychol.* 1, 1990.

van Koppen, Peter J. Risk Taking in Civil Law Negotiations. 14 *Law & Human Behavior* 151, 1990.

I claim:

1. A digital computer system operable and programmable by an inexpert user as a persuasion organizer and calculator expert system comprising:

a storage means to store an interactively dynamic knowledge base and an interactively dynamic persuasive calculus, said knowledge base and said persuasive calculus having at least one hierarchically-definable variable, wherein said storage means includes a means operable by said user to define at least one of said knowledge base, said persuasive calculus, or said at least one hierarchically-definable variable; and a processing means for receiving commands from said user, for interpreting said commands, for controlling said interactively dynamic knowledge base and said interactively dynamic persuasive calculus in response to said commands, for modifying said knowledge base and said persuasive calculus in response to said commands, for interrogating said knowledge base and said persuasive calculus in response to said commands, for computing a value based on an interrogation of said knowledge base, and for applying said value to said persuasive calculus, said digital computer system employing said storage means and said processing means to produce a response to user.

2. The digital computer system as recited in claim 1 wherein said storage means further includes a means operable by said user to define within said persuasive calculus at least one fixed element modeling a decisional framework.

3. The digital computer system as recited in claim 2 wherein said at least one fixed element defines an element of a persuasion process.

4. The digital computer system as recited in claim 1 in which said interactively dynamic persuasive calculus is iconically definable.

5. The digital computer system as recited in claim 1 interactively coupled with a legal case management system, said case management system operable and programmable by said user.

6. The digital computer system as recited in claim 1 wherein said storage means further includes a means operable by said user to define said at least one hierarchically-definable definable variable as an element of a persuasion process.

7. The digital computer system as recited in claim 1 wherein said at least one hierarchically-definable variable defines a legal probability.

8. The digital computer system as recited in claim 1 wherein said at least one hierarchically-definable variable defines a legal standard of proof.

9. The digital computer system as recited in claim 1 wherein said response to said user comprises a prediction of the strength of a persuasive argument, said prediction of strength deriving from said user's definition of at least one of said knowledge base, said persuasive calculus, or said at least one hierarchically-definable variable.

10. The digital computer system as recited in claim 9 wherein said response to said user further comprises an option to allow said user to modify said at least one hierarchically-definable variable of said interactively dynamic knowledge base.

11. The digital computer system as recited in claim 9 wherein said response to said user further comprises an option to allow said user to modify said at least one hierarchically-definable variable of said interactively dynamic persuasive calculus.

12. A digital computer system operable and programmable by an inexpert user as a persuasion organizer and calculator expert system comprising:

a storage means to store an interactively dynamic knowledge base, said knowledge base having at least one hierarchically-definable variable, wherein said storage means includes a means operable by said user to define at least one of said knowledge base or said at least one hierarchically-definable variable; and a processing means for receiving commands from said user, for interpreting said commands, for controlling said interactively dynamic knowledge base in response to said commands, for modifying said knowledge base in response to said commands, for interrogating said knowledge base in response to said commands, and for computing a value based on an interrogation of said knowledge base, said digital computer system employing said storage means and said processing means to produce a response to said user.

13. The digital computer system as recited in claim 12 in which said interactively dynamic persuasive calculus is iconically definable.

14. The digital computer system as recited in claim 12 interactively coupled with a legal case management system, said case management system operable and programmable by said user.

15. A digital computer system operable and programmable by an inexpert user as a persuasion organizer and calculator expert system comprising:

a storage means to store an interactively dynamic persuasive calculus, said persuasive calculus having at least one hierarchically-definable variable, wherein said storage means includes a means operable by said user to define at least one of said persuasive calculus or said at least one hierarchically-definable variable; and a processing means for receiving commands from said user, for interpreting said commands, for controlling said interactively dynamic persuasive calculus in response to said commands, for modifying said persuasive calculus in response to said commands, for interrogating said persuasive calculus in response to said commands, and for computing a value based on an interrogation of said persuasive calculus, said digital computer system employing said storage means and said processing means to produce a response to said user.

16. The digital computer system as recited in claim 15 in which said interactively dynamic persuasive calculus is iconically definable.

17. The digital computer system as recited in claim 15 interactively coupled with a legal case management system, said case management system operable and programmable by said user.

* * * * *